(12) United States Patent
Yoshida

(10) Patent No.: US 7,658,995 B2
(45) Date of Patent: Feb. 9, 2010

(54) NICKEL POWDER COMPRISING SULFUR AND CARBON, AND PRODUCTION METHOD THEREFOR

(75) Inventor: Mitsugu Yoshida, Chigasaki (JP)

(73) Assignee: Toho Titanium Co., Ltd., Kanagawa (JP)

( * ) Notice: Subject to any disclaimer, the term of this patent is extended or adjusted under 35 U.S.C. 154(b) by 123 days.

(21) Appl. No.: 11/629,494

(22) PCT Filed: Jun. 13, 2005

(86) PCT No.: PCT/JP2005/010794

§ 371 (c)(1),
(2), (4) Date: Dec. 14, 2006

(87) PCT Pub. No.: WO2005/123307

PCT Pub. Date: Dec. 29, 2005

(65) Prior Publication Data

US 2007/0254156 A1 Nov. 1, 2007

(30) Foreign Application Priority Data

Jun. 16, 2004 (JP) ............................. 2004-178814

(51) Int. Cl.
*B32B 5/16* (2006.01)
*C22B 11/00* (2006.01)
*C23C 8/52* (2006.01)
*C23C 8/78* (2006.01)

(52) U.S. Cl. ........................... 428/402; 148/27; 148/28; 148/30; 148/206; 148/426; 148/513; 148/675; 75/392; 75/710; 75/711; 75/738; 428/403

(58) Field of Classification Search ................ 428/402, 428/403; 75/332, 370, 392, 711, 717; 148/105, 148/206, 513, 559, 675, 24, 27, 28, 30, 416
See application file for complete search history.

(56) References Cited

U.S. PATENT DOCUMENTS 3,790,149 A 2/1974 Crosby
3,816,098 A * 6/1974 Mackiw et al. ............... 75/370

(Continued)

FOREIGN PATENT DOCUMENTS

EP 0 792 199 9/1997

(Continued)

OTHER PUBLICATIONS

Kirchhof, Thermal Production of Pourable Sulfur-Depolarized Nickel Anodes, Neue Huette, 32(3), XP009114636, 1987, pp. 86-90.

(Continued)

*Primary Examiner*—H. (Holly) T Le
(74) *Attorney, Agent, or Firm*—Antonelli, Terry, Stout & Kraus, LLP.

(57) ABSTRACT

A nickel powder exhibits superior oxidation behavior, reduction behavior and sintering behavior in a production process for a multilayer ceramic capacitor and is suitable for the capacitor; a production method therefor is also provided. The nickel powder, which may be used as a raw material, is treated with a sulfur-containing compound, and the sulfur-containing compound is coated on the surface thereof, or alternatively, a nickel-sulfur compound layer is formed on the surface thereof.

29 Claims, 2 Drawing Sheets

U.S. PATENT DOCUMENTS

| | | | | |
|---|---|---|---|---|
| 3,975,507 | A * | 8/1976 | Matson | 423/561.1 |
| 5,584,908 | A | 12/1996 | Scheie | |
| 6,103,868 | A * | 8/2000 | Heath et al. | 528/482 |
| 6,228,141 | B1 * | 5/2001 | Araki et al. | 75/255 |
| 6,645,444 | B2 * | 11/2003 | Goldstein | 423/1 |
| 6,863,708 | B2 * | 3/2005 | Kagohashi et al. | 75/364 |
| 7,081,214 | B2 * | 7/2006 | Matsuba et al. | 252/512 |
| 7,261,761 | B2 * | 8/2007 | Kagohashi et al. | 75/343 |
| 7,344,583 | B2 * | 3/2008 | Wendland et al. | 75/343 |
| 7,390,440 | B2 * | 6/2008 | Hirakoso et al. | 252/500 |
| 2002/0035891 | A1 | 3/2002 | Katayama et al. | |
| 2003/0196516 | A1 | 10/2003 | Katayama et al. | |

FOREIGN PATENT DOCUMENTS

| | | |
|---|---|---|
| EP | 0 900 611 | 3/1999 |
| JP | 49-122513 | 11/1974 |
| JP | 08-246001 | 9/1996 |
| JP | 08-259844 | 10/1996 |
| JP | 11-080816 | 3/1999 |
| JP | 2001-284161 | 10/2001 |
| JP | 2002-252139 | 9/2002 |
| JP | 2003-147417 | 5/2003 |
| JP | 2004-002923 | 1/2004 |
| JP | 2004-244654 | 9/2004 |
| JP | 3790149 B | 4/2006 |

OTHER PUBLICATIONS

EP Search Report with English translation of Application No. EP 05748831.4 dated Apr. 20, 2009.

* cited by examiner

NICKEL POWDER COMPRISING SULFUR AND CARBON, AND PRODUCTION METHOD THEREFOR

TECHNICAL FIELD

The present invention relates to a metallic nickel powder which is suitable for electrically conductive pastes, and in particular, relates to a metallic nickel powder having superior oxidation resistance and sintering properties which can be used for internal electrodes in a multilayer ceramic capacitor, and relates to a production method therefor.

BACKGROUND ART

Conventionally, noble metal powders such as those of silver, palladium, platinum, and gold, or base metal powders such as those of nickel, cobalt, iron, molybdenum, and tungsten, are used in conductive pastes as electrical materials, and in particular, in internal electrodes of multilayered ceramic capacitors. Generally, a multilayer ceramic capacitor is made by alternately laminating ceramic dielectric layers and metallic layers which are used as internal electrodes, and by forming external electrodes which are connected to the metallic layer of internal electrodes on two outside faces of the ceramic dielectric layers. As a ceramic for forming a dielectric layer, materials which contain a high dielectric constant material as a main component such as barium titanate, strontium titanate, and yttrium oxide, can be used.

On the other hand, the noble metal powders or the base metal powders mentioned above may be used to form the internal electrodes; however, since more inexpensive electrical materials are required recently, multilayer ceramic capacitors in which the base metal powders are used have been greatly developed, and in particular, nickel powder has been mainly developed.

As a general production method for a multilayer ceramic capacitor, a dielectric powder such as one of barium titanate is mixed with an organic binder so as to be suspended, and then the suspension is formed into a sheet by a doctor blade method to form a dielectric green sheet. On the other hand, a metal powder for an internal electrode is mixed with organic compounds such as an organic solvent, plasticizer, or organic binder to form a metal powder paste, and this paste is coated on the green sheet mentioned above by screen printing. Next, they are dried, laminated, and pressed, and then the organic component is removed by heat treatment, and they are sintered at about 1300° C. or at more than 1300° C. Subsequently, outer electrodes are baked on both sides of the dielectric ceramic layer to obtain a multilayer ceramic capacitor.

In the production method of the multilayer ceramic capacitor described above, organic components are vaporized and driven off by heating after the metal paste is printed, laminated and pressed on the dielectric green sheet, and the heating treatment is ordinarily performed at 250 to 400° C. in air. In this way, since the heating treatment is performed under an oxidizing atmosphere, the metal powder is oxidized, and therefore, the volume of the metal powder is increased. In addition, in recent years, evaporating to remove the organic component due to the above heating is often carried out in a reducing atmosphere, and in this case, the metal powder is reduced and shrinks. Furthermore, the metal powder is sintered at a higher temperature, after the heating for removing the organic component, and this sintering is carried out in a reducing atmosphere such as a hydrogen gas atmosphere. Thus, the volume of the metal powder is reduced.

As a result, in the process for production of multilayer ceramic capacitors, volume changes occur due to expansion or shrinkage of the metal powder by oxidizing and reducing reactions. In addition, in a dielectric, volume changes also occur by sintering, and since different materials, which are the dielectric and the metal powder, are simultaneously sintered, sintering behaviors such as volume changes due to expansion and shrinkage of each material in sintering, etc., differ. Therefore, deformation may easily occur in the metal paste layer, and as a result, breaking of the layer structure, which is called delamination, such as cracking or exfoliation, may occur.

Specifically, sintering of the dielectric which, for example, comprises barium titanate as a main component, starts at 1000° C. or more, and generally at 1200 to 1300° C., whereas in contrast, sintering of the metal powder used for the inside electrode starts at a lower temperature, for example, at generally 400 to 500° C. in the case of the nickel powder. Delamination is generated by the difference in the sintering start temperatures in the sintering behavior.

Many techniques have been suggested to overcome the delamination problem. For example, Patent Publication 1 discloses nickel powder having a tap density of more than a certain limit value versus a certain particle diameter. In addition, Patent Publication 2 discloses nickel superfine powder having an average particle diameter of 0.2 to 0.5 μm and an abundance ratio of coarse grains which is twice the average particle diameter of 0.1% or less at a number standard. The nickel fine powder disclosed in the Patent Publication 1 was developed in order to prevent the generation of internal defects such as cracking or peeling when it is used as an inside electrode of a multilayer ceramic capacitor, etc. In addition, the nickel superfine powder disclosed in the Patent Publication 2 was developed in order to prevent the generation of short-circuits, cracking, or peeling in an inside electrode of a multilayer ceramic capacitor.

Patent Publication 1 is Japanese Unexamined Patent Application Publication No. Hei 08-246001. Patent Publication 2 is Japanese Unexamined Patent Application Publication No. 2002-252139.

DISCLOSURE OF THE INVENTION

Problems Solved by the Invention

The above-mentioned conventional technique is variously efficient for improving sintering behavior; however, it is not sufficient to prevent delamination of the multilayer ceramic capacitor, and further improvement is required.

Therefore, objects of the present invention are to provide a nickel powder in which superior oxidation characteristics and sintering characteristics are exhibited in a production process for a multilayer ceramic capacitor to prevent delamination of the multilayer ceramic capacitor, which may be used for a conductive paste, and in particular for a multilayer ceramic capacitor, and a process of production therefor.

Means for Solving the Problems

The inventors researched nickel powders, and as a result, they found that a nickel powder which is superior in thermal behavior such as oxidation behavior, reduction behavior, sintering behavior, etc., can be produced by containing sulfur and carbon therein at suitable amounts, thereby accomplishing the present invention. That is, the nickel powder of the present invention contains sulfur and carbon, or it is treated with a sulfur-containing compound. The sulfur-containing compound is preferably a sulfur-containing organic compound, and is more preferably a thiol compound or a thioamide compound. Specifically, 2-mercaptobenzothiazole, 2-mercaptobenzoimidazole, triazine thiol, thiourea, etc., can be employed. It is desirable that the nickel powder of the present invention be one in which the sulfur-containing compound is coated or adhered on the surface thereof or in which a layer of a mixed compound containing nickel and sulfur is formed on the surface thereof.

The contents of sulfur and carbon in the nickel powder of the present invention are selected from 0.01 to 1.0 mass %, and are preferably 0.05 to 0.5 mass %. In the case in which the contents of sulfur and carbon in the nickel powder are less than 0.01 mass %, improvement in the sintering behavior cannot be obtained. In contrast, in the case in which the contents of sulfur and carbon in the nickel powder exceed 1.0 mass %, there is a problem in that electrical characteristics of the multilayer ceramic capacitor are deteriorated, etc. Furthermore, the nickel powder of the present invention is in fine particles having an average particle diameter of 1.0 μm or less, preferably 0.05 to 1 μm, and more preferably 0.1 to 0.5 μm. In addition, the nickel powder desirably has a specific surface area as measured by a BET method of 1 to 20 $m^2/g$.

Next, the production method of the nickel powder of the present invention is a method for suitably producing the above nickel powder, and it comprises treating the nickel powder with a sulfur-containing compound. As a result, the sulfur-containing compound is coated on the surface of the nickel powder, or a layer of a nickel-sulfur compound such as Ni—S, Ni—S—O, etc., is formed on the surface of the nickel powder. Thus, by forming the coating layer of a sulfur-containing compound or the nickel-sulfur compound layer on the surface of the nickel powder, a nickel powder having superior oxidation resistance and superior sintering behavior in which sintering start temperature is high and shrinkage ratio is small, can be obtained.

The above sulfur-containing compound is preferably a sulfur-containing organic compound, and is more preferably at least one kind of a thiol compound and a thioamide compound. Specifically, at least one kind of 2-mercaptobenzothiazole, 2-mercaptobenzoimidazole, triazine thiol, thiourea, etc., can be employed, and of these, thiourea is preferable since treatment therewith is the most effective.

In addition, the production method of the nickel powder of the present invention can also include treatment with a carbonate solution before the treatment with the above sulfur-containing compound, and furthermore, can also include drying and heating in an oxidizing atmosphere, after treatment with the above sulfur-containing compound. Additionally, it is preferable that the nickel powder of the present invention be produced by a vapor phase reduction method using nickel chloride vapor or a thermal decomposition method using a nickel compound.

According to the nickel powder of the present invention, since sulfur and carbon are contained at predetermined amounts and the sulfur-containing compound is coated or adhered on the surface thereof, superior oxidation characteristics and sintering characteristics can be exhibited in a production process of a multilayer ceramic capacitor so as to prevent delamination of the multilayer ceramic capacitor, which may be used for a conductive paste, and in particular for a multilayer ceramic capacitor.

The nickel powder produced by the production method of the present invention changes slightly in weight when it is heated in an oxidizing atmosphere to remove the organic component in a production process of a multilayer ceramic capacitor in which it is used in an inside electrode. In addition, in the case in which the nickel powder is heated in a reducing atmosphere, it exhibits superior reduction resistance in which the reduction start temperature is increased, and it is difficult for the weight to be drastically decreased in the heating. Furthermore, the sintering start temperature is high, and the volume change by sintering is small. This means that it is difficult to cause delamination in the firing of the multilayer ceramic capacitor, as described above. Therefore, the nickel powder produced by the production method of the present invention exhibits superior oxidation behavior, reduction behavior and sintering behavior in the production process for the multilayer ceramic capacitor, and has an effect in which it is difficult to cause delamination.

EXPLANATION OF REFERENCE SYMBOLS

Figure 1:
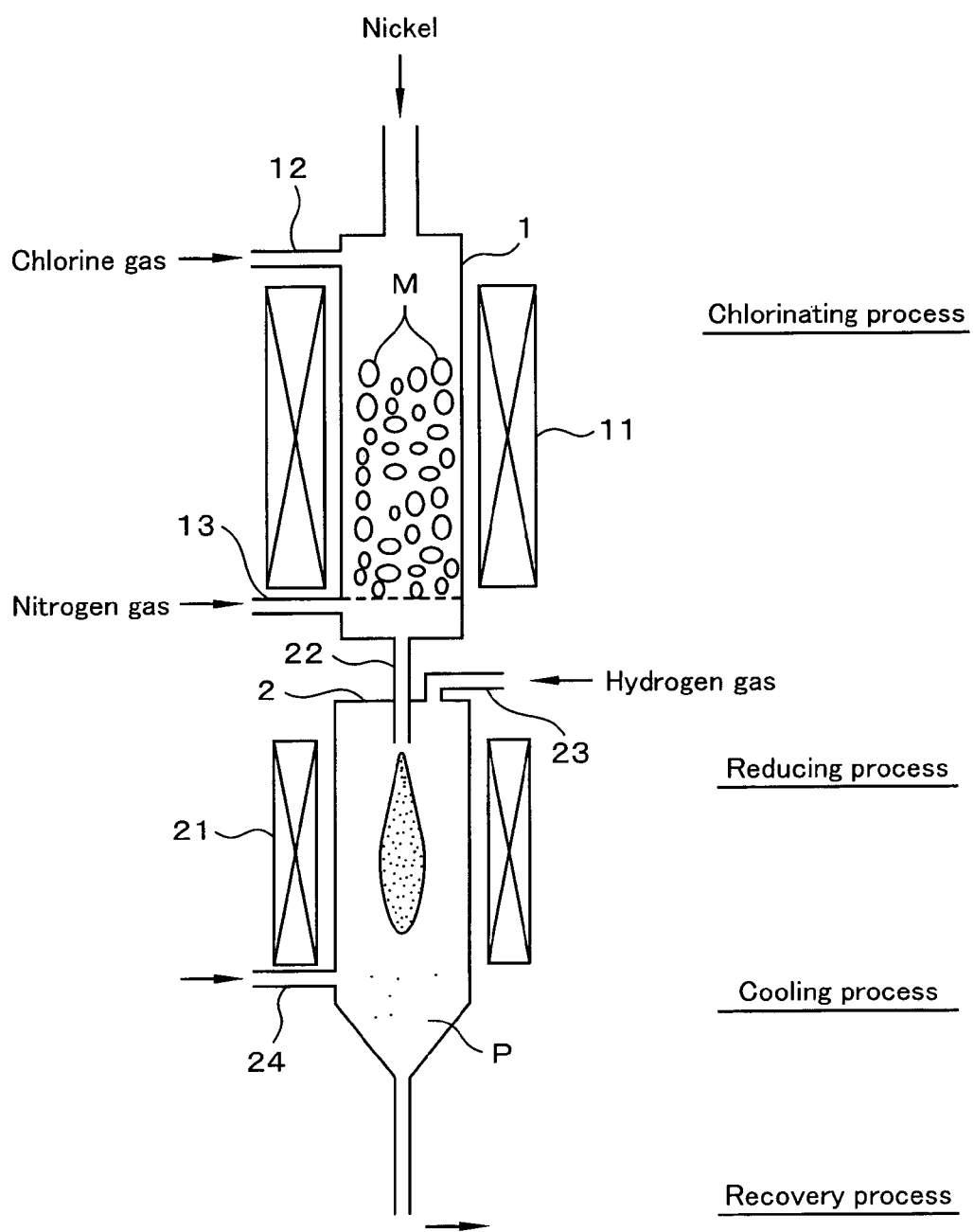
FIG. 1 is a longitudinal cross section showing a structure of the production device for nickel powder used in the Examples of the present invention.

1 . . . Chlorination furnace, 2 . . . Reduction furnace, M . . . Raw material of nickel powder, P . . . Produced nickel powder.

BEST MODE FOR CARRYING OUT THE INVENTION

In the following, a preferred embodiment of the present invention will be explained in detail.

The nickel powder of the present invention can be produced by a known method such as a gas-phase method or a liquid phase method. In particular, a gas-phase reduction method in which nickel chloride gas and reducing gas are contacted to produce nickel powder, or an atomization heat decomposition method in which a nickel compound which is easily decomposed with heat is atomized and thermally decomposed is desirable, since the particle diameter of metal powder generated can be easily controlled and spherical particles can be efficiently produced.

Usually in the gas-phase reduction method of the nickel powder, vaporized nickel chloride gas and a reducing gas such as hydrogen are reacted, and nickel chloride gas can also be generated by heating and vaporizing solid nickel chloride. However, from the viewpoints of suppression of oxidation or moisture absorbency of nickel chloride and energy efficiency, it is advantageous that nickel chloride gas be continuously generated by contacting metallic nickel and chlorine gas, and that the nickel chloride gas be directly supplied to a reducing process, and then that the nickel chloride gas be contacted with reducing gas to reduce the nickel chloride gas continuously so as to produce nickel fine powder.

In the production process for nickel powder by the gas-phase reduction reaction, nickel atoms are generated at the moment nickel chloride gas and reducing gas are contacted, and the nickel atoms collide and clump to form superfine particles, and the particles grow larger. Depending on conditions such as temperature or partial pressure of nickel chloride gas during the reducing process, the particle diameter of generated fine nickel powder is determined. In the above-mentioned process for production of nickel powder, since the nickel chloride gas is generated depending on the supplied amount of chlorine gas, the amount of nickel chloride gas supplied to the reducing process can be controlled by controlling the amount of chlorine gas, and as a result, the particle diameter of nickel powder which is generated can be controlled.

Furthermore, the method is different from a method in which metal chloride gas is generated by heating and vaporizing the solid metal chloride, since metal chloride gas is generated by a reaction of chlorine gas and a metal, the amount of a carrier gas used can be reduced, and in some cases, under certain production conditions, it is possible to use no carrier gas. Therefore, the gas-phase reduction method is more desirable from the viewpoint of production cost since the amount of carrier gas and energy used for heating can be reduced.

The partial pressure of nickel chloride gas during the reducing process can be controlled by mixing inert gas with the nickel chloride gas generated in the chlorinating process. In this way, the particle diameter of the nickel powder can be controlled by controlling the amount of chlorine gas supplied or by controlling the partial pressure of the nickel chloride gas supplied in the reducing process, and therefore, the particle diameter of the nickel powder can be stable and can be changed as desired.

Usually, production conditions of the nickel powder in the above-mentioned gas-phase reduction method are determined to obtain an average particle diameter of 1 μm or less. For example, the particle diameter of metallic nickel, which is a starting material, is determined to be in a range of from 5 to 20 mm, and the shape is desirably granular, aggregated, or placoid. The purity is desirably 99.5% or more. First, the metallic nickel is reacted with chlorine gas to generate nickel chloride gas. The temperature of this reaction is 800° C. or more to promote the reaction sufficiently, and is 1453° C. or less, which is the melting point of nickel. Considering the reaction rate and durability of a chlorination furnace, a range of from 900 to 1100° C. is desirable in practical use.

Next, this nickel chloride gas is directly supplied to a reducing process to contact and react with a reducing gas such as hydrogen. At this time, inert gas such as nitrogen or argon can be mixed with the nickel chloride gas in a range of from 1 to 30 mol % before being supplied to the reducing process. In addition, chlorine gas can be supplied to the reducing process by using only the chlorine gas itself, or together with nickel chloride gas. By supplying chlorine gas to the reducing process, the partial pressure of the nickel chloride gas can be controlled, and as a result, the particle diameter of nickel powder which is produced can be controlled. The temperature of the reducing process is set at not less than a temperature sufficient to complete the reaction; however, the temperature is desirably not more than the melting point of nickel since nickel powder in a solid state is easier to handle. Considering production costs, the temperature is in a range of from 900 to 1100° C. in practical use.

After the nickel powder is generated by the reducing reaction, the powder is cooled. During the cooling, to prevent the formation of a secondary particle formed by aggregating of primary particles of nickel generated and to obtain nickel powder having a desired particle diameter, it is desirable that gas flow at about 1000° C. after the reducing reaction be rapidly cooled to a temperature in a range of from 400 to 800° C. by blowing inert gas such as nitrogen. After that, the nickel powder is separated and recovered by a bag filter or the like.

In the process for production of nickel powder by the atomization heat decomposition method, a nickel compound which is easily decomposed by heat is used. Specifically, one or more kinds selected from nitrate, sulfate, oxynitrate, oxysulfate, chloride, ammonium complex, phosphate, carboxylate, and alkoxy compound of nickel, can be mentioned. A solution containing the nickel compound is atomized to form fine liquid drops. As a solvent used therein, water, alcohol, acetone, ether, or the like can be mentioned. To atomize the solution, ultrasonic waves or a double jet nozzle can be used. The fine liquid drops generated therein are heated to decompose the metallic compound, and a nickel powder is generated. The heating temperature at this time is not less than a temperature to decompose the specific nickel compound used, and is desirably near the melting point of nickel.

In the production method of metal fine powder by the liquid phase method, nickel hydroxide is generated by adding a nickel-containing solution, for example, nickel sulfate, nickel chloride, or nickel complex, to an alkali metal hydroxide such as sodium hydroxide. Next, the nickel hydroxide is reduced by a reducing agent such as hydrazine to obtain a metallic nickel powder. The metallic nickel powder generated can be pulverized if necessary to obtain uniform particles.

It is desirable that the nickel power produced as described above be suspended in a carbonate solution. By using the carbonate solution, impurities such as chlorine which adhere to the surface of nickel are sufficiently removed, and hydroxides such as nickel hydroxide which are present at the surface of the nickel powder and fine particles peeled from the surface thereof by friction of the particles, etc., are removed, so that a uniform nickel oxide layer is formed.

During the suspending treatment in the carbonate solution, in the production method for metallic nickel powder by the gas-phase reduction method and the atomization heat decomposition method, the produced nickel powder is ordinarily washed with pure water; alternatively, it is washed with a carbonate solution, is washed by introducing carbonate gas in a water slurry after washing with pure water, or is washed by adding carbonate solution to the water slurry. In particular, in the case in which the gas-phase reduction method is applied, it is desirable that the nickel powder in mid-flow or after washing with pure water in a slurry state be contacted with a carbonate solution from the viewpoint of simplification of the production process.

The pH of the carbonate solution in the treatment is in a range of from 5.5 to 6.5, desirably in a range of from 5.5 to 6.0. In the case in which the treatment is performed at less than pH 5.5, a non-uniform oxide layer is formed on the surface of the metallic nickel powder, and the sintering properties of the nickel powder are deteriorated. Furthermore, the nickel powder itself is dissolved, and the surface becomes rough. In the case in which the treatment is performed at more than pH 6.5, hydroxide attached or adsorbed on the surface of the nickel powder cannot be removed, and the remaining hydroxide becomes a non-uniform oxide layer after a drying process.

Next, after the nickel powder is treated in the carbonate solution as described above, it is treated with a sulfur-containing compound. By using the sulfur-containing compound, a sulfur-containing compound layer or a nickel and sulfur compound layer is formed on the surface of the nickel powder, and thereby, thermal behaviors such as oxidation behavior, reduction behavior, sintering behavior, etc., of the nickel powder can be improved. As a treatment method with a sulfur-containing compound, for example, the following methods can be used.

(1) A method of dry-mixing a dried nickel powder and a sulfur-containing compound (2) A method of mixing a nickel powder slurry with a sulfur-containing compound solution or an alcohol solution such as ethanol, isopropanol, etc.

(3) A method of adding a sulfur-containing compound to a nickel powder slurry

Of these methods, (2) the method of mixing a nickel powder slurry with a sulfur-containing compound solution or an alcohol solution has advantages of simplification of the production process and uniformity of a sulfur-compound layer or a nickel-sulfur compound layer.

The temperature range in which the nickel slurry is mixed with the sulfur-containing compound solution is 20 to 60° C., and it is preferably 20 to 40° C. In addition, the sulfur-containing compound is adjusted so that the sulfur content in the nickel powder after processing is 0.01 to 1 mass % and is preferably 0.05 to 0.5 mass %. The mixed nickel slurry with the sulfur-containing compound solution is subjected to agitation, ultrasonic treatment, etc. The treatment time is 10 to 60 minutes, and it is preferably 15 to 30 minutes.

The nickel powder is dried after it is treated by the sulfur-containing compound as described above. As the drying method of the metallic nickel powder, a known method can be performed. Practically, gas flow drying in which high-temperature gas is contacted with the powder, heating drying, or vacuum drying can be performed. In particular, the gas flow drying is desirable since abrasion of the oxide layer due to contact of particles does not occur. To form a uniform oxide layer on the surface of the nickel powder, it is desirable that water be removed and that it be dried in a very short time.

Specifically, the desirable time in which nickel powder in a water slurry state or a powder having a water content of about 50 mass % loses the water therein until it has 0.1 mass % or less, is not more than 1 minute, is desirably not more than 30 seconds, and is more desirably not more than 10 seconds. The gas flow drying method is desirable since the nickel powder can be dried within these time periods. In the gas flow drying, high-temperature nitrogen gas at 200 to 300° C., desirably at about 250° C., is used.

In the present invention, the nickel powder is desirably heated in the air or an oxygen gas atmosphere after the above-mentioned treatment with a sulfur-containing compound and drying. In particular, it is desirable that the powder be treated in a carbonate solution, be treated with a sulfur-containing compound, be dried by gas flow drying until the water content is 0.1 mass % or less, and be heated in an oxidizing atmosphere. The temperature of the heating in the oxidizing atmosphere is ordinarily from 100 to 400° C., is preferably from 200 to 300° C., and is more preferably from 200 to 250° C. The heating treatment time is ordinarily in a range of from 30 minutes to 10 hours, and the heat treatment is performed so that the oxygen content in the nickel powder is in a range of from 0.3 to 2.0 mass %.

With respect to the sintering start temperature of the nickel powder, the following facts are known. That is, sintering is not started when the oxide film exists on the surface of the nickel powder; however, in the case in which the oxide film does not exist by reducing with an increase in the firing temperature, the sintering of the metal fine powder is started. For example, since the sintering of the nickel powder usually starts at 200 to 300° C., a homogeneous and stable oxide film is formed, so that the nickel powder is not reduced even if it is heated over 200 to 300° C., and as a result, reduction resistance of the nickel powder can be improved and therefore, the sintering start temperature can be shifted to a higher temperature. A homogeneous oxide film is formed on the surface of the nickel powder by heating in an oxidizing atmosphere as described above, and therefore, the reduction resistance can be improved. Furthermore, the oxidation resistance can also be improved by forming such a homogeneous stabilized oxide film.

Hydroxides, such as nickel hydroxide which exists on the surface of the nickel powder or fine particles formed by exfoliation from the surface of the nickel powder due to friction of particles, can be removed by treating the nickel powder with a carbonate solution as described above. Next, the nickel powder having a sulfur-containing compound film or a nickel-sulfur compound layer can be formed on the surface thereof by treating with a sulfur-containing compound. Additionally, by drying and heating the nickel powder in an oxidizing atmosphere after treating with a sulfur-containing compound, a sulfur-containing compound film or the nickel-sulfur compound layer is homogeneously formed, and a uniform oxide film is formed on the surface of the particle.

Consequently, the reducing resistance of the nickel powder is further improved, and effects of the sintering behavior improvement such as the sintering start temperature shifting to a higher temperature, decreasing of the shrinkage rate, etc., is obtained. In addition, since the sulfur-containing compound film and the nickel-sulfur compound layer are stabilized by heating, the film and the compound layer can be prevented from deteriorating by aging or during pasting processes or production processes for a multilayer ceramic capacitor, and deterioration of the sintering behavior or the reducing resistance can also be prevented. By carrying out the above heating in an oxidizing atmosphere within a temperature range of 100 to 400° C., (1) the sulfur-containing compound film and the nickel-sulfur compound layer are stabilized, and (2) the uniform oxide film is formed without oxidizing the nickel powder inside, and therefore, thermal behaviors such as reduction behavior and sintering behavior are further improved. In addition, the above heating temperature range is preferable, since that increasing of resistance in the inside electrode can be prevented.

EXAMPLES

Example 1

A. Production of Nickel Powder

Metallic nickel shot M having an average diameter of 5 mm which was a starting material was filled in a chlorination furnace 1 of a production device for nickel powder shown in FIG. 1, and the temperature of the atmosphere in the furnace was held at 1100° C. Next, chlorine gas was supplied in the chlorination furnace 1 through a nozzle 12, and nickel chloride gas was generated by chlorinating the metallic nickel shot M, and then nitrogen gas which was supplied through a nozzle 13 was mixed with the nickel chloride gas. The mixture gas of the nickel chloride gas and the nitrogen gas was induced into a reducing furnace 2 having an internal atmosphere temperature of 1000° C. heated by a heating device 21 through a nozzle 22 at a flow rate of 2.3 m/min (conversion at 1000° C.).

At the same time, hydrogen gas was supplied through a nozzle 23 in the reducing furnace 2 at a flow rate of 7 Nl/min so that nickel powder P was obtained by reducing the nickel chloride gas. The nickel powder P generated in the reducing process was cooled by contacting nitrogen gas supplied through a nozzle 24. Then, the nickel powder P was separated and recovered, and it was washed by hot water, and carbonic acid gas was blown into the nickel powder slurry to maintain the pH at 5.5, and the nickel powder P was treated in the carbonate solution for 60 minutes at room temperature. Subsequently, the nickel powder slurry was washed by water so as to remove carbonic acid, and thereby, the metallic nickel powder was obtained.

B. Treatment by Thiourea

An ethanol solution of thiourea was added to the nickel powder slurry obtained as described above so that the sulfur content in the nickel powder was 0.1 mass %, and the nickel powder slurry was subjected to ultrasonic treatment at room temperature for 30 minutes. Next, the nickel powder slurry was heated to 200° C. for 30 minutes in the air after it was dried by an air flow dryer, and the nickel powder of Example 1 was produced.

Example 2

The nickel powder was adjusted in the same manner as that of Example 1, and the thiourea treatment and the drying by an air flow dryer were carried out in the same manner as in Example 1 and the heating in the air was not carried out, and thereby, the nickel powder of Example 2 was produced.

Comparative Example

The nickel powder was adjusted in the same manner as that of the Examples, and the thiourea treatment was not carried out and the drying by an air flow dryer and the heating at 200° C. for 30 minutes in the air were carried out, and thereby, the nickel powder of the Comparative Example was produced.

Figure 2:
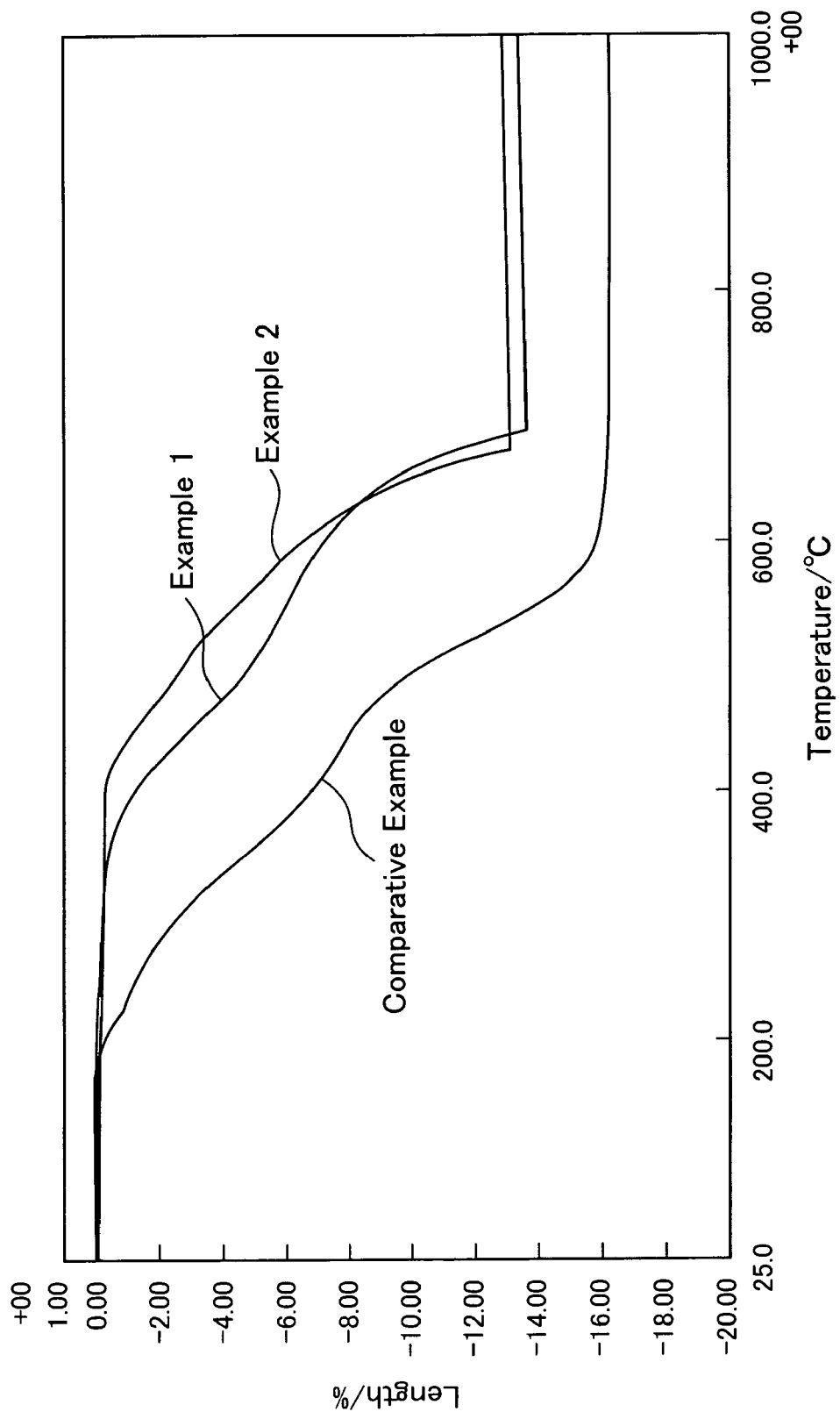
FIG. 2 is a graph showing sintering behavior measured in the Examples.

With respect to the above-mentioned nickel powder of each Example and Comparative Example, the average particle diameter, sulfur content, carbon content, and oxidation behavior were measured by the following methods, and the results are shown in Table 1. In addition, a graph showing the sintering behavior measured by the following method is shown in FIG. 2.

a. Average Particle Diameter

A photograph of the nickel powder was taken by an electron microscope, particle diameters of 200 particles were measured from the photograph, and the average value was calculated. Here, the particle diameter was defined as a diameter of a minimum circle which encloses the particle.

b. Contents of Sulfur and Carbon

The contents of sulfur and carbon in the nickel powder were measured by a sintering-infrared absorption method using EMGA-520SP (trade name), produced by HORIBA Ltd. 0.5 g of the nickel powder and metal tin and metal tungsten were placed in an alumina crucible and were heated and sintered in oxygen air flow by a high-frequency current, and the amounts of $SO_2$ and $CO_2$ generated therein were detected and measured by infrared rays to calculate the contents of sulfur and carbon in the nickel powder.

c. Oxidation Behavior

The sample was heated at a temperature increase rate of 5° C./min until 1000° C. in air, and the weight increase ratio (%) at 300° C. and a temperature at which weight was increased 1% were measured by a thermogravimetry-differential thermal analysis device (trade name: TG-DTA, TG 8120, produced by Rigaku Corporation).

d. Sintering Behavior 1 g of nickel powder, 3 weight % of camphor and 3 weight % of acetone were mixed, and the mixture was filled in a metallic mold having an inner diameter of 5 mm and a length of 10 mm, and loading of a surface pressure of 1 ton was applied to prepare a test piece. Using a measuring device for thermal expansion shrinkage behavior (diratometry) (trade name: TMA, 8310, produced by Rigaku Corporation), the sintering start temperature of this test piece was measured under conditions of temperature increase rate of 5° C./min in a weakly reducing atmosphere (mixed gas of 1.5% hydrogen and 98.5% nitrogen).

TABLE 1

| | Average Particle Diameter (μm) | Sulfur Content (%) | Carbon Content (%) | Oxidation Behavior | |
|---|---|---|---|---|---|
| | | | | Weight Increase Ratio at 300° C. (%) | Temperature at which Weight Increased by 1% (° C.) |
| Example 1 | 0.24 | 0.11 | 0.51 | 0 | 420 |
| Example 2 | 0.24 | 0.11 | 0.51 | 0.8 | 350 |
| Comparative Example | 0.24 | <0.001 | <0.01 | 1.8 | 271 |

As is apparent from Table 1, in the nickel powder of the present invention (Examples 1 and 2), the weight increase ratio at 300° C. was smaller than that of the Comparative Example and the temperature at which the weight increase rate was 1% was shifted to a higher temperature, although the average particle diameter was the same, and therefore, oxidation resistance thereof was superior. In addition, as is apparent from FIG. 2, in the nickel powder of the Comparative Example, a volume change was generated at about 200° C., and it is believed that this is a start point of the sintering, and the shrinkage rate at about 600° C. reached about −16%, and in contrast, in the nickel powder of the present invention, there was no volume change up to about 400° C., the sintering was completed at about 700° C., and the shrinkage rate at that time was about −14%. From these results, it was found that the nickel powder of the present invention is superior to conventional nickel powders in reduction resistance and sintering behavior.

From these results, the nickel powder of the present invention exhibits superior oxidation behavior, reduction behavior, and sintering behavior during the production process for a multilayer ceramic capacitor, and as a result, delamination can be efficiently prevented.

The invention claimed is:

1. A nickel powder comprising 0.01 to 1.0 mass % of sulfur and 0.01 to 1.0 mass % of carbon, wherein the powder comprises particles having an average particle diameter of 0.05 to 1.0 μm.

2. The nickel powder according to claim 1, wherein the sulfur is contained in a sulfur-containing compound coated or adhered on the surface thereof.

3. The nickel powder according to claim 1, wherein the sulfur is contained in a layer of a mixed compound containing nickel and sulfur formed on the surface thereof.

4. The nickel powder according to claim 1, wherein the nickel powder is treated with a sulfur-containing organic compound.

5. The nickel powder according to claim 4, wherein the sulfur-containing organic compound is a thiol compound or a thioamide compound.

6. The nickel powder according to claim 4, wherein the sulfur-containing organic compound is thiourea.

7. The nickel powder according to claim 1, wherein the nickel powder is obtained by treating a nickel powder with a carbonate solution.

8. The nickel powder according to claim 1, wherein the nickel powder is obtained by heating a nickel powder in an oxidizing atmosphere simultaneously with treating with a sulfur-containing compound or after treating with a sulfur-containing compound.

9. The nickel powder according to claim 1, wherein the nickel powder is produced by a gas-phase reduction method using nickel chloride vapor or a thermal decomposition method using a nickel compound.

10. The nickel powder according to claim 1, wherein the sulfur is contained in a layer of a sulfur compound or a mixed compound containing nickel and sulfur, and wherein an oxide layer is provided on a surface of the powder.

11. A production method for a nickel powder comprising providing a nickel powder and then treating the nickel powder with a sulfur-containing organic compound, wherein the nickel powder obtained comprises 0.01 to 1.0 mass % of sulfur and 0.01 to 1.0 mass % of carbon, and wherein the powder comprises particles having an average particle diameter of 0.05 to 1.0 μm.

12. The production method for nickel powder according to claim 11, wherein the sulfur-containing organic compound is a thiol compound or a thioamide compound.

13. The production method for nickel powder according to claim 12, wherein the nickel powder is treated with a carbonate solution and then treated with the sulfur-containing organic compound.

14. The production method for nickel powder according to claim 12, wherein the nickel powder is heated in an oxidizing atmosphere simultaneously with treatment with the sulfur-containing organic compound or after the treatment with the sulfur-containing organic compound.

15. The production method for nickel powder according to claim 12, wherein the nickel powder is produced by a gas-phase reduction method using a nickel chloride vapor or a thermal decomposition method using a nickel compound.

16. The production method for nickel powder according to claim 12, further comprising drying and heating in an oxidizing atmosphere after treatment with the sulfur-containing organic compound.

17. The production method for nickel powder according to claim 16, wherein the drying is carried out by contacting with inert gas at 200 to 300° C.

18. The production method for nickel powder according to claim 11, wherein the sulfur-containing organic compound is thiourea.

19. The production method for nickel powder according to claim 18, wherein the nickel powder is treated with a carbonate solution and then treated with the sulfur-containing organic compound.

20. The production method for nickel powder according to claim 18, wherein the nickel powder is heated in an oxidizing atmosphere simultaneously with treatment with the sulfur-containing organic compound or after the treatment with the sulfur-containing organic compound.

21. The production method for nickel powder according to claim 18, wherein the nickel powder is produced by a gas-phase reduction method using a nickel chloride vapor or a thermal decomposition method using a nickel compound.

22. The production method for nickel powder according to claim 18, further comprising drying and heating in an oxidizing atmosphere after treatment with the sulfur-containing organic compound.

23. The production method for nickel powder according to claim 22, wherein the drying is carried out by contacting with inert gas at 200 to 300° C.

24. The production method for nickel powder according to claim 11, wherein the nickel powder is treated with a carbonate solution and then treated with the sulfur-containing organic compound.

25. The production method for nickel powder according to claim 11, wherein the nickel powder is heated in an oxidizing atmosphere simultaneously with treatment with the sulfur-containing organic compound or after the treatment with the sulfur-containing organic compound.

26. The production method for nickel powder according to claim 11, wherein the nickel powder is produced by a gas-phase reduction method using a nickel chloride vapor or a thermal decomposition method using a nickel compound.

27. The production method for nickel powder according to claim 11, further comprising drying and heating in an oxidizing atmosphere after treatment with the sulfur-containing organic compound.

28. The production method for nickel powder according to claim 27, wherein the drying is carried out by contacting with inert gas at 200 to 300° C.

29. The production method for nickel powder according to claim 11, wherein the powder comprises particles having an average particle diameter of 0.1 to 0.5 μm.

* * * * *